United States Patent
Ahrens et al.

(10) Patent No.: US 12,487,765 B2
(45) Date of Patent: Dec. 2, 2025

(54) SYSTEM MEMORY TRAINING WITH CHIPSET ATTACHED MEMORY

(71) Applicant: Advanced Micro Devices, Inc., Santa Clara, CA (US)

(72) Inventors: Jerry Anton Ahrens, Sister Bay, WI (US); William Robert Alverson, Del Valle, TX (US); Joshua Taylor Knight, Georgetown, TX (US); Amitabh Mehra, Fort Collins, CO (US); Anil Harwani, Austin, TX (US); Grant Evan Ley, Eden, UT (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/146,929

(22) Filed: Dec. 27, 2022

(65) Prior Publication Data

US 2024/0211160 A1    Jun. 27, 2024

(51) Int. Cl.
*G06F 12/00* (2006.01)
*G06F 3/06* (2006.01)

(52) U.S. Cl.
CPC ............ *G06F 3/0647* (2013.01); *G06F 3/061* (2013.01); *G06F 3/0658* (2013.01); *G06F 3/0673* (2013.01); *G06F 3/0683* (2013.01)

(58) Field of Classification Search
CPC ...... G06F 3/0647; G06F 3/061; G06F 3/0658; G06F 3/0673; G06F 3/0683
See application file for complete search history.

(56) References Cited

U.S. PATENT DOCUMENTS

| | | |
|---|---|---|
| 6,295,591 B1 | 9/2001 | Bealkowski et al. |
| 6,467,048 B1 | 10/2002 | Olarig et al. |
| 6,714,891 B2 | 3/2004 | Dendinger |
| 7,038,687 B2 | 5/2006 | Booth, Jr. et al. |
| 9,886,987 B1 * | 2/2018 | Brahmadathan .......... G11C 29/56012 |
| 10,691,570 B1 | 6/2020 | Lui et al. |
| 11,262,924 B2 | 3/2022 | Alverson et al. |
| 11,493,389 B2 | 11/2022 | Horng et al. |
| 11,720,266 B2 | 8/2023 | Alverson et al. |

(Continued)

FOREIGN PATENT DOCUMENTS

| | | |
|---|---|---|
| CN | 114780473 A | 7/2022 |
| WO | 2024144870 A1 | 7/2024 |

OTHER PUBLICATIONS

U.S. Appl. No. 16/711,875, filed Jun. 8, 2023, "Corrected Notice of Allowability", U.S. Appl. No. 16/711,875, filed Jun. 8, 2023, 4 pages.

(Continued)

*Primary Examiner* — Mardochee Chery
(74) *Attorney, Agent, or Firm* — FIG 1. Patents (57) ABSTRACT

System memory training with chipset attached memory is described. In accordance with the described techniques, a request is received to train a system memory of a device. Responsive to the request, contents of the system memory are transferred to a chipset attached memory. The device is operated using the contents from the chipset attached memory. While the device is being operated using the contents from the chipset attached memory, the system memory is dynamically trained. After the training is complete, the contents are transferred back from the chipset attached memory to the trained system memory.

20 Claims, 5 Drawing Sheets

(56) References Cited

U.S. PATENT DOCUMENTS

| | | | |
|---|---|---|---|
| 11,740,944 | B2 | 8/2023 | Mehra et al. |
| 12,399,846 | B2 | 8/2025 | Ahrens et al. |
| 2002/0010875 | A1 | 1/2002 | Johnson et al. |
| 2002/0129186 | A1 | 9/2002 | Emerson et al. |
| 2003/0074591 | A1 | 4/2003 | Mcclendon et al. |
| 2003/0154428 | A1 | 8/2003 | Pelner |
| 2003/0206050 | A1 | 11/2003 | Huard et al. |
| 2003/0208650 | A1 | 11/2003 | Depew et al. |
| 2003/0208654 | A1 | 11/2003 | Krontz et al. |
| 2004/0133756 | A1 | 7/2004 | Shaw et al. |
| 2004/0153723 | A1 | 8/2004 | Depew et al. |
| 2005/0283561 | A1 | 12/2005 | Lee et al. |
| 2006/0136763 | A1 | 6/2006 | Jorgenson et al. |
| 2006/0161375 | A1 | 7/2006 | Duberstein et al. |
| 2008/0028236 | A1 | 1/2008 | Capps et al. |
| 2008/0317086 | A1 | 12/2008 | Santos et al. |
| 2009/0150660 | A1 | 6/2009 | Yao et al. |
| 2010/0131221 | A1 | 5/2010 | Chien |
| 2011/0131400 | A1 | 6/2011 | Chiu et al. |
| 2013/0205130 | A1 | 8/2013 | Hallowell et al. |
| 2013/0262728 | A1 | 10/2013 | Wong |
| 2014/0032949 | A1 | 1/2014 | Kim et al. |
| 2014/0159806 | A1 | 6/2014 | Kim et al. |
| 2015/0063420 | A1 | 3/2015 | Cho et al. |
| 2015/0242154 | A1 | 8/2015 | Yang et al. |
| 2015/0378745 | A1 | 12/2015 | He et al. |
| 2016/0011802 | A1* | 1/2016 | Berke ................ G06F 3/0619 711/166 |
| 2016/0179643 | A1 | 6/2016 | Sun et al. |
| 2017/0160956 | A1 | 6/2017 | Chinnakkonda et al. |
| 2017/0262388 | A1 | 9/2017 | Lin et al. |
| 2018/0088638 | A1 | 3/2018 | Nguyen et al. |
| 2018/0107591 | A1 | 4/2018 | Smith |
| 2018/0217005 | A1 | 8/2018 | Kanodia |
| 2018/0253317 | A1 | 9/2018 | Pan et al. |
| 2019/0310947 | A1 | 10/2019 | Raisch et al. |
| 2019/0369683 | A1 | 12/2019 | Vishnubhatla et al. |
| 2020/0065022 | A1 | 2/2020 | Itagaki et al. |
| 2021/0089461 | A1* | 3/2021 | Choi ................ H03K 7/08 |
| 2021/0182121 | A1 | 6/2021 | Mehra et al. |
| 2021/0255966 | A1* | 8/2021 | Chen ................ G06F 9/4411 |
| 2021/0326232 | A1 | 10/2021 | Partiwala et al. |
| 2021/0349730 | A1* | 11/2021 | Lee ................ G06F 11/2284 |
| 2022/0155982 | A1 | 5/2022 | Alverson et al. |
| 2022/0179756 | A1* | 6/2022 | Fan ................ G06F 11/1469 |
| 2022/0357855 | A1 | 11/2022 | Narasingarayanapeta et al. |
| 2023/0418590 | A1 | 12/2023 | Gunyuzlu et al. |
| 2024/0211416 | A1 | 6/2024 | Ahrens et al. |
| 2024/0319712 | A1 | 9/2024 | Ahrens et al. |
| 2024/0319903 | A1 | 9/2024 | Alverson et al. |
| 2024/0330076 | A1 | 10/2024 | Ahrens et al. |
| 2024/0330134 | A1 | 10/2024 | Ahrens et al. |

OTHER PUBLICATIONS

U.S. Appl. No. 16/711,875, filed Sep. 2, 2021, "Final Office Action", U.S. Appl. No. 16/711,875, filed Sep. 2, 2021, 17 pages.

U.S. Appl. No. 16/711,875, filed Oct. 27, 2022, "Final Office Action", U.S. Appl. No. 16/711,875, filed Oct. 27, 2022, 17 pages.

U.S. Appl. No. 16/711,875, filed Jan. 25, 2021, "Non-Final Office Action", U.S. Appl. No. 16/711,875, filed Jan. 25, 2021, 16 pages.

U.S. Appl. No. 16/711,875, filed Feb. 17, 2022, "Non-Final Office Action", U.S. Appl. No. 16/711,875, filed Feb. 17, 2022, 16 pages.

U.S. Appl. No. 17/591,924, filed Oct. 20, 2022, "Non-Final Office Action", U.S. Appl. No. 17/591,924, filed Oct. 20, 2022, 12 pages.

Ahrens, Jerry Anton, et al., "U.S. Application as Filed", U.S. Appl. No. 18/146,920, filed Dec. 27, 2022, 43 pages.

U.S. Appl. No. 16/711,875, "Corrected Notice of Allowability", U.S. Appl. No. 16/711,875, filed Apr. 27, 2023, 2 pages.

U.S. Appl. No. 16/711,875, "Notice of Allowance", U.S. Appl. No. 16/711,875, filed Apr. 14, 2023, 5 pages.

U.S. Appl. No. 17/591,924, "Notice of Allowance", U.S. Appl. No. 17/591,924, filed Mar. 15, 2023, 5 pages.

Ahrens, Jerry Anton, et al., "U.S. Application as Filed", U.S. Appl. No. 18/187,848, filed Mar. 22, 2023, 44 pages.

Ahrens, Jerry Anton, et al., "U.S. Application as Filed", U.S. Appl. No. 18/190,664, filed Mar. 27, 2023, 37 pages.

Ahrens, Jerry Anton, et al., "U.S. Application as Filed", U.S. Appl. No. 18/190,521, filed Mar. 27, 2023, 45 pages.

Alverson, William Robert, et al., "U.S. Application as Filed", U.S. Appl. No. 18/187,900, filed Mar. 22, 2023, 59 pages.

U.S. Appl. No. 18/146,920, "Final Office Action", U.S. Appl. No. 18/146,920, filed Apr. 25, 2024, 15 pages.

U.S. Appl. No. 18/187,900, "Non-Final Office Action", U.S. Appl. No. 18/187,900, filed Aug. 12, 2024, 10 pages.

U.S. Appl. No. 18/146,920, "Non-Final Office Action", U.S. Appl. No. 18/146,920, filed Jan. 26, 2024, 12 pages.

PCT/US2023/036376, "International Seach Report and Written Opinion", PCT Application No. PCT/US2023/036376, Feb. 29, 2024, 8 pages.

U.S. Appl. No. 18/146,920, "Final Office Action", U.S. Appl. No. 18/146,920, filed Nov. 22, 2024, 15 pages.

U.S. Appl. No. 18/187,900, "Final Office Action", U.S. Appl. No. 18/187,900, filed Dec. 4, 2024, 12 pages.

U.S. Appl. No. 18/190,664, "Non-Final Office Action", U.S. Appl. No. 18/190,664, filed Nov. 13, 2024, 13 pages.

"Corrected Notice of Allowability", U.S. Appl. No. 18/146,920, filed May 7, 2025, 2 pages.

"Notice of Allowance", U.S. Appl. No. 18/146,920, filed Apr. 23, 2025, 9 pages.

"Non-Final Office Action", U.S. Appl. No. 18/187,900, filed Mar. 13, 2025, 11 pages.

"Final Office Action", U.S. Appl. No. 18/190,664, filed Feb. 26, 2025, 13 pages.

"Corrected Notice of Allowability", U.S. Appl. No. 18/146,920, filed Jun. 3, 2025, 2 pages.

"Corrected Notice of Allowability", U.S. Appl. No. 18/146,920, filed Jul. 29, 2025, 2 pages.

"Non-Final Office Action", U.S. Appl. No. 18/187,848, filed Jun. 26, 2025, 20 pages.

"Notice of Allowance", U.S. Appl. No. 18/187,900, filed Aug. 5, 2025, 9 pages.

"Non-Final Office Action", U.S. Appl. No. 18/190,664, filed Jun. 24, 2025, 14 pages.

"Corrected Notice of Allowability", U.S. Appl. No. 18/187,900, filed Oct. 22, 2025, 5 pages.

"Non-Final Office Action", U.S. Appl. No. 18/190,521, filed Oct. 27, 2025, 11 pages.

* cited by examiner

302
Transfer contents of a system memory to a chipset attached memory via a chipset link

304
Operate a device using the contents from the chipset attached memory

306
While the device is being operated using the contents from the chipset attached memory, the system memory is reset and dynamically trained

SYSTEM MEMORY TRAINING WITH CHIPSET ATTACHED MEMORY

BACKGROUND

Computer games and other applications are regularly advancing, resulting in larger programs, higher resolution graphics, new features, and so forth. To address these advances, computer hardware is also advancing to provide new types of memory having faster data rates, faster clock rates, and so forth. Additionally, techniques such as overclocking are used to run hardware at speeds and timings that are faster than how the hardware is configured to run by default.

DETAILED DESCRIPTION

Overview

System memory training with chipset attached memory is described. In accordance with the described techniques, a computing system uses a chipset attached memory to continue operating seamlessly while a system memory is reset and retrained, such as by using one or more training or retraining algorithms. Such training or retraining is destructive to the contents of the system memory. As such, the computing system uses the chipset attached memory to continue running an operating system and/or an application while the system memory is powered down and "offline" and during a boot-up process of the system memory, which includes training or retraining the system memory.

To do so, contents of the system memory are transferred via a chipset link to the chipset attached memory. Once the contents are transferred to the chipset attached memory, various operations are performed using the contents from the chipset attached memory. For example, a processing unit executes (and/or continues to seamlessly execute) one or more tasks of an operating system and/or an application using the contents from the chipset attached memory. Such tasks are performed using the contents from the chipset attached memory rather than using the contents from the system memory, using the same contents that were previously in the main system memory but are now available transparently to the application in the chipset attached memory.

While such operations are performed using the contents from the chipset attached memory, the system memory is reset and trained, such as by the memory controller. For example, the system memory is trained according to one or more training algorithms or methodologies. In at least one variation, the training is destructive to the contents stored in the system memory.

After the training is complete, and the system memory returns to a working state (e.g., G0/S0 state as specified by Advanced Configuration and Power Interface (ACPI)), the contents are transferred back from the chipset attached memory to the trained system memory via the chipset link. Once the contents are transferred back to the system memory, various operations are performed using the contents from the system memory as trained—rather than performing the operations using the contents from the chipset attached memory. For example, the processing unit executes (and/or continues seamlessly executing) one or more tasks of an operating system and/or an application using the contents from the system memory.

Continuing to operate the system by performing memory-based tasks while the main system memory is being reset and trained, contrasts with conventional techniques. Rather than continuing to run an operating system or an application on a processing unit while system memory is reset and trained, conventional techniques also power down and reboot attached processing units (and/or the system altogether), initializing the hardware of various components of the system. By continuing to operate using the chipset attached memory, though, the described techniques enable memory-based tasks to continue being performed (which keeps operating systems, applications, and so on running) during reset and training of the system. As a result, "down time" of the system is reduced and/or eliminated, which reduces interruptions to various tasks (e.g., background tasks) and improves a user experience.

In some aspects, the techniques described herein relate to an apparatus including: a system memory, and a memory controller configured to: provide a transfer request to the system memory to cause contents maintained by the system memory to be transferred from the system memory to a chipset attached memory, and train the system memory, and a processing unit to execute one or more tasks using the contents from the chipset attached memory while the system memory is being trained.

In some aspects, the techniques described herein relate to an apparatus, wherein the memory controller is further configured to, after the system memory is trained, provide an additional transfer request to the chipset attached memory to cause the contents to be transferred back from the chipset attached memory to the trained system memory.

In some aspects, the techniques described herein relate to an apparatus, wherein the processing unit is further configured to execute one or more tasks using the contents transferred back to the trained system memory.

In some aspects, the techniques described herein relate to an apparatus, wherein the memory controller provides the transfer request responsive to receiving a request to train the system memory.

In some aspects, the techniques described herein relate to an apparatus, wherein the request to train the system memory includes one or more specified memory settings or a specified memory profile.

In some aspects, the techniques described herein relate to an apparatus, wherein the request to train the system memory includes a user request.

In some aspects, the techniques described herein relate to an apparatus, wherein the user request identifies a specific improvement to the system memory.

In some aspects, the techniques described herein relate to an apparatus, wherein the specific improvement of the system memory includes one or more of an improvement in speed, performance, power, usage, or accuracy.

In some aspects, the techniques described herein relate to an apparatus, wherein the request includes an automatic system request.

In some aspects, the techniques described herein relate to a method including: transferring, via a chipset link, contents of a system memory to a chipset attached memory, operating a device using the contents from the chipset attached memory, and while the device is being operated using the contents from the chipset attached memory, resetting the system memory and dynamically training the system memory during a reset phase.

In some aspects, the techniques described herein relate to a method, wherein the operating the device includes executing, by a processing unit of the device, one or more tasks of an operating system or an application using the contents from the chipset attached memory.

In some aspects, the techniques described herein relate to a method, further including, after the system memory is trained, transferring, via the chipset link, the contents back from the chipset attached memory to the trained system memory via the chipset link.

In some aspects, the techniques described herein relate to a method, further including operating the device using the contents transferred back to the trained system memory.

In some aspects, the techniques described herein relate to a method, further including, after the system memory is trained, outputting one or more notifications indicating that the system memory has been trained.

In some aspects, the techniques described herein relate to a method, wherein the transferring occurs responsive to receiving a request to train the system memory.

In some aspects, the techniques described herein relate to a method, wherein the request to train the system memory includes one or more specified memory settings or a specified memory profile.

In some aspects, the techniques described herein relate to a method, wherein the request to train the system memory includes a user request.

In some aspects, the techniques described herein relate to a method, wherein the user request identifies a specific improvement to the system memory that includes one or more of an improvement in speed, performance, power, usage, or accuracy.

In some aspects, the techniques described herein relate to a method, wherein the request includes an automatic system request.

In some aspects, the techniques described herein relate to a system including: a system memory, a chipset attached memory configured to store contents of the system memory while the system memory is trained and transfer the contents back to the trained system memory after the training is complete, and a processing unit configured to perform operations using the contents stored in the chipset attached memory while the system memory is being trained.

Figure 1:
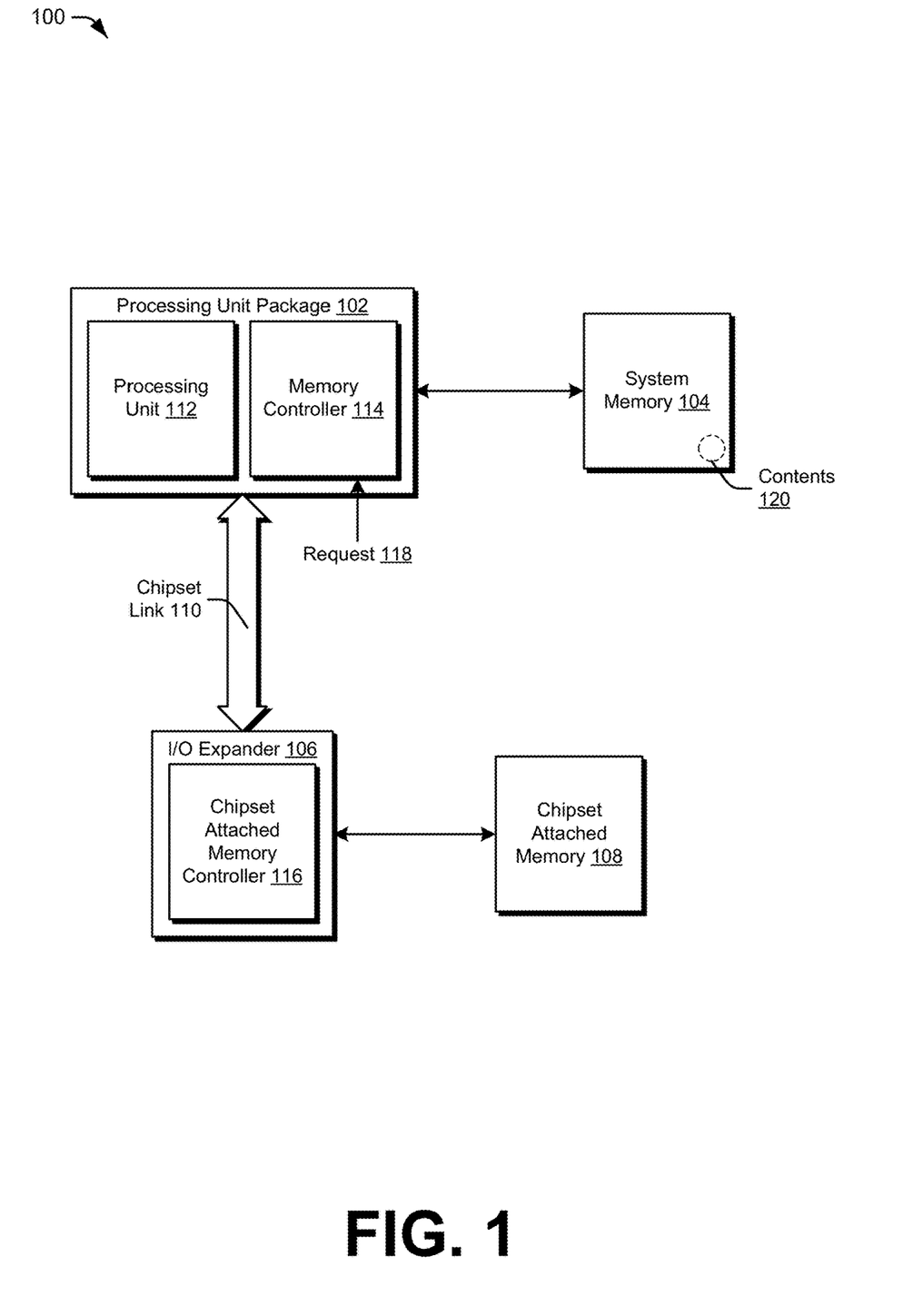
FIG. 1 is an illustration of a non-limiting example system that employs a chipset attached memory to continue operation of the system while memory training system memory.

FIG. 1 is an illustration of a non-limiting example system 100 that employs a chipset attached memory to continue operation of the system while memory training system memory. The system 100 includes a processing unit package 102, a system memory 104, an I/O expander 106, a chipset attached memory 108, and a chipset link 110. The processing unit package 102, the system memory 104, the I/O expander 106, the chipset attached memory 108, and the chipset link 110 are installed on or are part of, for example, a motherboard or other printed circuit board. In one or more implementations, the I/O expander 106 (including the chipset attached memory controller 116), the chipset link 110, one or more memory channels between the processing unit package 102 and the system memory 104, and one or more memory channels between the I/O expander 106 and the chipset attached memory 108 are also referred to as a chipset of a motherboard or other printed circuit board. In one or more variations, the chipset link 110 is routed entirely on the motherboard itself. In one or more other variations, the I/O expander 106 (including the chipset attached memory controller 116) and the chipset attached memory 108 are implemented on an add-in card that is connected to the motherboard via one or more sockets.

The processing unit package 102 includes a processing unit 112 and a memory controller 114. The processing unit 112 is any of various processing units, such as a central processing unit (CPU), a graphics processing unit (GPU), an Accelerated Processing Unit (APU), a parallel accelerated processor, a digital signal processor, an artificial intelligence (AI) or machine learning accelerator, and so forth. Although a single processing unit 112 is illustrated in the system 100, the processing unit package 102 optionally includes any number of processing units of the same or different types.

The system memory 104 is any of a variety of types of physical RAM. Examples of system memory 104 include dynamic random-access memory (DRAM), phase-change memory (PCM), memristors, static random-access memory (SRAM), and so forth. The system memory 104 is coupled or attached to the processing unit package 102 via one or more memory channels. The system memory 104 is packaged or configured in any of a variety of different manners. Examples of such packaging or configuring include a dual in-line memory module (DIMM), a small outline DIMM (SO-DIMM), a registered DIMM (RDIMM), a non-volatile DIMM (NVDIMM), a ball grid array (BGA) memory permanently attached to (e.g., soldered to) the motherboard (or other printed circuit board), and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the system memory 104 is configured as or includes a SO-DIMM or an RDIMM according to one of the above-mentioned standards, e.g., DDR, DDR2, DDR3, DDR4, and DDR5.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the system memory 104 is configurable in a variety of ways without departing from the spirit or scope of the described techniques.

The memory controller 114 manages access to the system memory 104, such as by sending read and write requests to the system memory 104 and receiving responses from the system memory 104. In one or more implementations, the system memory 104 is physical memory managed by an operating system running on the processing unit 112 (e.g., a CPU), such as by allocating portions of the system memory 104 to applications running on the processing unit 112, managing virtual memory spaces and memory pages for applications running on the processing unit 112, and so forth.

The processing unit package 102 optionally includes one or more additional controllers to link to additional devices, such as a Peripheral Component Interconnect Express (PCIe) controller, a Serial Advanced Technology Attachment (SATA) controller, a Universal Serial Bus (USB) controller, a Serial Peripheral Interface (SPI) controller, a Low Pin Count (LPC) controller, and so forth. Additionally or alternatively, one or more of these additional controllers is implemented separate from the processing unit package 102, such as in a chip (e.g., an integrated circuit optionally referred to as a northbridge) that is part of the chipset of a motherboard or other printed circuit board.

The processing unit package 102 communicates with the I/O expander 106 via the chipset link 110. The chipset link 110 is any of a variety of communication links, such as a high-speed bus. In one example, the chipset link 110 is one or more PCIe lanes.

The I/O expander 106 includes a chipset attached memory controller 116. The I/O expander 106 optionally includes or is coupled to one or more additional controllers to link to other devices, such as a PCIe controller, a SATA controller, a USB controller, an SPI controller, an LPC controller, and so forth. In one or more implementations, the I/O expander 106 is referred to as a southbridge.

The chipset attached memory controller 116 manages access to the chipset attached memory 108, such as by sending read and write requests to the chipset attached memory 108 and receiving responses from the chipset attached memory 108. The chipset attached memory 108 is referred to as "chipset attached" due to the chipset attached memory 108 being attached to the I/O expander 106 rather than the processing unit package 102 directly, and due to the chipset attached memory 108 being controlled by a memory controller of the I/O expander 106 rather than a memory controller of the processing unit package 102. The chipset attached memory 108 is coupled or attached to the I/O expander 106 via one or more memory channels.

The chipset attached memory 108 is physical memory managed by an application or program other than an operating system running on the processing unit 112. The chipset attached memory 108 is separate from the system memory 104, allowing the chipset attached memory to be used in various manners, such as to speed up access to frequently used data, without reducing the amount of system memory 104 available to an operating system running on the processing unit 112.

The chipset attached memory 108 is any of a variety of types of physical memory. Examples of chipset attached memory 108 include random-access memory (RAM), such as DRAM, PCM, memristors, SRAM, and so forth. The chipset attached memory 108 is volatile memory or non-volatile memory. The chipset attached memory 108 is packaged or configured in any of a variety of different manners. Examples of such packaging or configuring include a DIMM, a SO-DIMM, an RDIMM, an NVDIMM, a BGA, a 3-dimensional (3D) stacked memory, on-package memory (e.g., memory included in the I/O expander 106), memory permanently attached to (e.g., soldered to) the motherboard, and so forth.

As noted above, examples of types of DIMMs include, but are not limited to, SDRAM, DDR SDRAM, DDR2 SDRAM, DDR3 SDRAM, DDR4 SDRAM, and DDR5 SDRAM. In at least one variation, the chipset attached memory 108 is configured as or includes a SO-DIMM or an RDIMM according to one of the above-mentioned standards, e.g., DDR, DDR2, DDR3, DDR4, and DDR5. Further examples of chipset attached memory configurations include LPDDR, such as LPDDR2, LPDDR3, LPDDR4, and LPDDR5. It is to be appreciated that the chipset attached memory 108 is configurable in a variety of ways without departing from the spirit or scope of the described techniques.

In accordance with the described techniques, the system 100 uses the chipset attached memory 108 to continue operating while the system memory 104 is reset and trained, such as by using one or more training or retraining algorithms. In variations, such training or retraining is destructive to the contents of memory. For example, the system 100 uses the chipset attached memory 108 to continue running an operating system and/or an application while the system memory 104 is powered down and "offline" and during a reset process of the system memory 104, which includes training or retraining the system memory 104. By way of example, and not limitation, during the reset process the memory controller 114 trains the system memory 104, at least in part, by running one or more algorithms for enabling data to be reliably written to and/or read from at least a portion of system memory 104 using a variety of memory settings (e.g., overclocking and non-overclocking settings). Examples of those algorithms include, but are not limited to a write leveling algorithm, a multi-purpose register (MPR) pattern write algorithm, a read centering algorithm, and/or a write centering algorithm. It is to be appreciated that in variations, dynamically training or retraining the system memory 104 includes more and/or different operations without departing from the spirit or scope of the described techniques.

Further, settings for operating the system memory 104 and based on which the system memory 104 is trained during the reset process, include, for instance, various power (e.g., voltage), frequency, clock, and/or temperature settings. Example settings include, but are not limited to, a data rate (e.g., megatransfers per second), a number of cycles between sending a column address to memory and the beginning of data in a response (e.g., CAS or tCAS), a minimum number of clock cycles to open a row and access a column (e.g., tRCD), a measure of latency between issuing a precharge command to idle or close open row and an activate command to open a different row (e.g., tRP), a minimum number of clock cycles between a row active command and issuing a precharge command (e.g., tRAS), nominal power supply voltage (e.g., VDD), output stage drain power voltage (e.g., VDDQ), and programming power voltage (e.g., VPP). It is to be appreciated that in variations, the system memory 104 is trained based on additional and/or different settings associated with operating memory without departing from the spirit or scope of the described techniques.

In one or more implementations, a request 118 to train the system memory 104 is received. The request 118 to train the system memory 104 can be a user request or a system request. By way of example, a user request to train the system memory 104 can be received responsive to a user providing an input via a user interface of a system-management application or a memory-management application (not shown) to train the system memory. In one or more implementations, the request 118 identifies one or more specified memory settings or a specified memory profile that is associated with a set of one or more memory settings. In one or more implementations, the request 118 identifies one or more specific improvements to the system memory 104. For example, the user can select an option to dynamically train or retrain the system memory 104 to achieve one or more improvements in speed, performance, power usage, or accuracy, to name just a few. In another example, the request 118 is based on an automatic system request. For instance, the request 118 can be received from an application or operating system automatically (e.g., without receiving user input). In this case, the automatic system request may request that the system memory 104 be trained or retrained with one or more specified memory settings and/or based on a memory profile (e.g., specified by the application or operating system) that is associated with a set of one or more memory settings. In one or more implementations, the system memory 104 is trained or retrained after changing one or more default operating parameters including, but not limited to voltage, frequency, timings, and sub-timings, to name just a few.

In the illustrated example, the memory controller 114 is depicted receiving the request 118 for training the system memory 104. In one or more implementations, the request 118 is received from an operating system and/or an application, e.g., executing on the processing unit 112 or portions of which execute on the processing unit 112. In at least one variation, the request 118 is received from another component of the system 100 or from a different component (not shown) coupled to the system 100.

In accordance with the described techniques, contents 120 of the system memory 104 are transferred via the chipset link 110 to the chipset attached memory 108. Based on or responsive to receipt of the request 118, for instance, the memory controller 114 causes the contents 120 of the system memory 104 to be transferred via the chipset link 110 to the chipset attached memory 108.

Once the contents 120 are transferred to the chipset attached memory 108, various operations are performed using the contents 120 from the chipset attached memory 108. For example, the processing unit 112 executes (and/or continues to execute) one or more tasks of an operating system and/or an application using the contents 120 from the chipset attached memory 108. Such tasks are performed using the contents 120 from the chipset attached memory 108 rather than using the contents 120 from the system memory 104.

While such operations are performed using the contents 120 from the chipset attached memory 108, the system memory 104 is reset and trained during a reset phase of the system memory 104, such as by the memory controller 114. For example, the system memory 104 is trained according to one or more training algorithms or methodologies. In at least one variation, the training is destructive to the contents 120 stored in the system memory 104.

Continuing to operate by performing memory-based tasks while the system memory 104 is being reset and trained during a reset or memory boot-up process, contrasts with conventional techniques. Rather than continuing to run an operating system or an application on a processing unit while system memory is reset and trained, conventional techniques also power down and reboot attached processing units (and/or the system 100 altogether), initializing the hardware of various components of the system. By continuing to operate using the chipset attached memory 108, though, the described techniques enable memory-based tasks to continue being performed (which keeps operating systems, applications, and so on running) during reset and training of the system memory 104. As a result, "down time" of the system 100 is reduced and/or eliminated, which reduces interruptions to various tasks (e.g., background tasks) and improves a user experience.

After the system memory 104 is trained—and returns to a working state (e.g., G0/S0 state as specified by Advanced Configuration and Power Interface (ACPI))—the contents 120 are transferred back from the chipset attached memory 108 to the trained system memory 104 via the chipset link 110. Once the contents 120 are transferred back to the system memory 104, various operations are performed using the contents 120 from the system memory 104 as trained—rather than performing the operations using the contents 120 from the chipset attached memory 108. For example, the processing unit 112 executes (and/or resumes executing) one or more tasks of an operating system and/or an application using the contents 120 from the system memory 104.

Thus, in one or more scenarios, the processing unit 112 operates using the contents 120 from the system memory 104, e.g., before the contents 120 are transferred to the chipset attached memory 108. The contents 120 are then transferred from the system memory 104 to the chipset attached memory 108 via the chipset link 110. The processing unit 112 subsequently operates (or continues to operate) using the contents 120 from the chipset attached memory 108, e.g., while the system memory 104 is reset, trained, and returned to a working state. The contents 120 are transferred from the chipset attached memory 108 to the system memory 104 via the chipset link 110, e.g., after the system memory 104 is trained. The processing unit 112 subsequently operates (or continues to operate) using the contents 120 from the system memory 104.

In one or more implementations, the system 100 outputs notifications after the system memory 104 has been trained indicating that such training has occurred. For example, such notifications are displayed on a display device via a graphical user interface and/or output audibly via a speaker. The display device that displays such notifications may be implemented as part of the device that includes the system memory 104 or as part of a separate device that is coupled to the device that includes the system memory 104. For example, the notifications may be communicated from the system 100 to a remote device via a wireless connection. By way of example and not limitation, the notification may be communicated from the system 100 to the remote device via a Bluetooth connection, via a Wi-Fi connection, or via the Internet (e.g., as an email message). The remote device connected to the system 100 may then output the notification, e.g., via a user interface of an application associated with the system 100. Additionally or alternatively, the system 100 outputs notifications indicating that operation of the system 100 has resumed operation using the contents 120 from the system memory 104, e.g., rather than operating using the contents 120 from the chipset attached memory 108. In at least one variation, such notifications are also displayed on a display device via a graphical user interface and/or output audibly via a speaker. In one or more implementations, other notifications and/or alerts are output, which indicate that the system memory 104 has been trained and that operation of the system 100 uses the contents 120 from the system memory 104.

The system 100 is implementable in any of a variety of different types of computing devices. For example, the system 100 is implementable in a device or apparatus such as a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, to name just a few.

Figure 2:
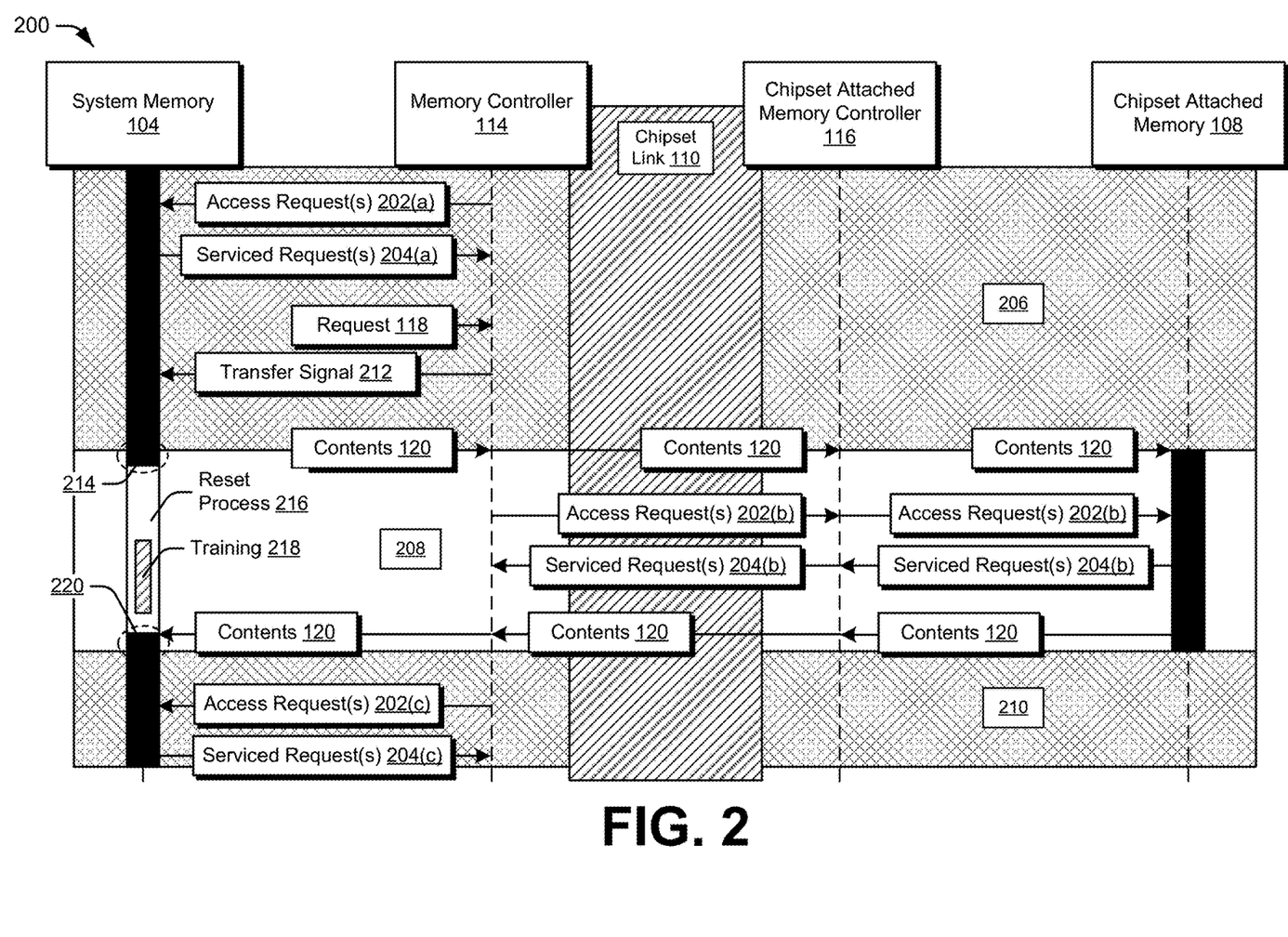
FIG. 2 depicts a non-limiting example in which chipset attached memory continues operation of a system during memory training of system memory.

FIG. 2 depicts a non-limiting example 200 in which chipset attached memory continues operation of a system during memory training of system memory. The example 200 includes the system memory 104, the memory controller 114, the chipset link 110, the chipset attached memory controller 116, and the chipset attached memory 108.

The example 200 includes a variety of example communications and operations between the system memory 104, the memory controller 114, the chipset link 110, the chipset attached memory controller 116, and the chipset attached memory 108 over time. In this example 200, the communications and operations are positioned vertically based on time, such that communications and operations closer to a top of the example occur prior to communications or operations further from the top of the example. It follows also that communications or operations closer to a bottom of the example occur subsequent to communications or operations further from the bottom. The example 200 also depicts various phases and/or states of the system 100 or portions of the system 100. These phases and/or states are also positioned in the example 200 vertically based on time, such that phases or states closer to a top of the example occur prior to phases, states, or communications further from the top.

Here, the illustrated example 200 depicts the system memory 104 receiving one or more access requests 202(a) (e.g., read and/or write requests) from the memory controller 114. The illustrated example 200 also depicts the memory controller 114 receiving one or more serviced requests 204(a) from the system memory 104. Where an access request 202(a) corresponds to a read request, for instance, the respective serviced request 204(a) includes or otherwise indicates data of one or more memory addresses associated with the access request 202(a). In contrast, where an access request 202(a) corresponds to a write request, the respective serviced request 204(a) involves updating the system memory 104 at one or more memory addresses associated with the write request, such as to store one or more indicated values.

Transmission of the access requests 202(a) and the servicing of them (e.g., as indicated by the serviced requests 204(a)) by the memory controller 114 and the system memory 104 represents a first phase 206 of operation of a device (and/or the system 100), which uses the contents 120 from the system memory 104. Transmission of the access requests 202(b) and the servicing of them (e.g., as indicated by the serviced requests 204(b)) between the memory controller 114, the chipset attached memory controller 116, and the chipset attached memory 108 represents a second phase 208 of operation of the device (and/or the system 100), which uses the contents 120 from the chipset attached memory 108. The subsequent transmission of the access requests 202(c) and the servicing of them (e.g., as indicated by the serviced requests 204(c)) by the memory controller 114 and the system memory 104 represents a third phase 210 of operation of the device (and/or the system 100), which uses the contents 120 from the system memory 104.

In this example 200, the memory controller 114 is depicted receiving the request 118 at a point in time during the first phase 206 of operation. It is to be appreciated that, in various scenarios, the request 118 is received interleaved with transmission of one or more access requests 202(a) and indications of serviced requests 204(a). As noted above, in one or more implementations, the request 118 is received based on user input, e.g., received via a user interface and specifying to train the system memory 104. As also noted above, in variations, the request 118 is application based, such that an application (not shown) requests that the system memory 104 be trained.

In one or more implementations, the memory controller 114 provides a transfer signal 212 to the system memory 104 (e.g., one or more write requests). For example, the transfer signal 212 initiates a transfer of the contents 120 maintained by the system memory 104 to the chipset attached memory 108. In variations, the contents 120 transferred ranges from a subset of data maintained in the system memory 104 to an entirety of the data maintained in the system memory 104. In terms of data flow, the contents 120 are transferred from the system memory 104 (e.g., over one or more memory interfaces) to the memory controller 114, which communicates the contents 120 over the chipset link 110 to the chipset attached memory controller 116 (e.g., of the I/O expander 106), and the chipset attached memory controller 116 communicates the contents 120 to the chipset attached memory 108 (e.g., over one or more memory interfaces), where the contents are stored. In one or more implementations, the chipset attached memory controller 116 stores the contents 120 in the chipset attached memory 108 using one or more write requests.

After the contents are transferred, operation of the device (and/or the system 100) uses the contents 120 from the chipset attached memory 108. This example 200 depicts overlap 214 between when the chipset attached memory 108 includes the contents 120, such that the system 100 is operable using the contents in the chipset attached memory 108, and when the system 100 is still operable using the system memory 104. In one or more variations, any of one or more components of the system 100 is configured to test the chipset attached memory 108 during such an overlap, e.g., to ensure that the chipset attached memory 108 is capable of operating properly before the system memory 104 is powered down and subsequently trained during a reset process. However, in at least one other variation, the chipset attached memory 108 is not tested before resetting the system memory 104 for training.

In the illustrated example 200, operability of the system memory 104 (e.g., in a working state such as the G0/S0 state as specified by ACPI) is indicated by black bars arranged perpendicularly to the system memory 104 block. By way of contrast, a reset process 216 of the system memory 104 is indicated by the white bar that is arranged between the black bars and perpendicular to the system memory 104 block. Further, operability of the chipset attached memory 108 is indicated by the black bar that is arranged perpendicularly to the chipset attached memory 108 block and that is disposed on the dashed line extending from the chipset attached memory 108 block.

During the second phase 208 of operation, the device (and or the system 100) operates using the contents 120 from the chipset attached memory 108, e.g., rather than using the system memory 104. Thus, the chipset attached memory 108 services read/write requests previously serviced by the system memory 104 during the first phase 206 of operation. In other words, during the second phase 208, the chipset attached memory 108 services one or more of the access requests 202(b), resulting in serviced requests 204(b) while the system memory 104 is non-operable. In this example 200, the subsequent access requests 202(b) are depicted being communicated from the memory controller 114 over the chipset link 110 to the chipset attached memory controller 116 and then to the chipset attached memory 108. By way of example, the access requests 202(b) are initiated by the processing unit 112, e.g., for executing one or more tasks of an operating system and/or application. Further, the serviced requests 204(b) are depicted being provided from the chipset attached memory 108 to the chipset attached memory controller 116 and over the chipset link 110 to the memory controller 114.

During the second phase 208 of operation—where the device is operated using the contents 120 from the chipset attached memory 108 and the system memory is non-operable—the system memory 104 is trained. In the illustrated example 200, training 218 of the system memory 104 is depicted as part of the reset process 216. In one or more implementations, the system memory 104 is powered off before entering the reset process. Examples of a powered-off phase include a soft off (e.g., G2/S5 state as specified by ACPI) and a mechanical off (e.g., G3 state as specified by ACPI), which require a reboot to return to a working state (e.g., G0/S0 state as specified by ACPI). During the reset process 216, the system 100 performs various operations, such as hardware initializations, to advance the system memory 104 to a working state.

In one or more implementations, the training 218 includes, for instance, running one or more algorithms for enabling data to be reliably written to and/or read from at least a portion of system memory 104 using various memory settings. Examples of those algorithms include, but are not limited to a write leveling algorithm, a multi-purpose register (MPR) pattern write algorithm, a read centering algorithm, and/or a write centering algorithm. Further, in at least one variation, the memory controller 114 trains the system memory 104. Notably, the memory controller 114 is able to directly access the system memory 104 during the training 218. In other words, the training 218 algorithms are run directly from the memory controller 114 into the system memory 104.

After the training 218, the contents 120 are transferred back to the system memory 104 as trained from the chipset attached memory 108 via the chipset link 110. In one or more implementations, the chipset attached memory controller 116 receives an indication (not shown) that indicates the system memory 104 is again operable, and is thus capable of servicing read/write requests. In at least one variation, such an indication indicates to the chipset attached memory controller 116 to initiate transfer of the contents 120 back to the trained system memory 104. In variations, the contents 120 transferred ranges from a subset of data maintained in the chipset attached memory 108 to an entirety of the data maintained in the chipset attached memory 108. In terms of data flow, the contents 120 are transferred from the chipset attached memory 108 (e.g., over one or more memory interfaces) to the chipset attached memory controller 116, which communicates the contents 120 over the chipset link 110 to the memory controller 114 (e.g., of the processing unit package 102), and the memory controller 114 communicates the contents 120 to the system memory 104 (e.g., over one or more memory interfaces), where the contents 120 are stored. In one or more implementations, the memory controller 114 stores the contents 120 in the system memory 104, as trained, using one or more write requests.

After the contents are transferred, operation of the device (and/or the system 100) uses the contents 120 from the system memory 104. This example 200 depicts overlap 220 between when the system memory 104 includes the contents 120, such that the system 100 is operable using the contents in the system memory 104, and when the system 100 is still operable using the chipset attached memory 108. In one or more variations, any of one or more components of the system 100 is configured to further test the system memory 104 during such an overlap, e.g., to ensure that the system memory 104 is capable of operating properly when operation of the system returns to using the system memory 104 instead of using the chipset attached memory 108. However, in at least one other variation, the system memory 104 is not tested in addition to the training 218 before returning operation from the chipset attached memory 108 to the system memory 104.

During the third phase 210 of operation, the device (and or the system 100) operates using the contents 120 from the system memory 104 as trained, e.g., rather than using the chipset attached memory 108. Thus, the trained system memory 104 services read/write requests, which were serviced by the chipset attached memory 108 during the second phase 208 of operation, e.g., while the system memory 104 was reset and trained. In other words, during the third phase 210, the system memory 104 again services one or more of the access requests 202(c), resulting in serviced requests 204(c).

Figure 3:
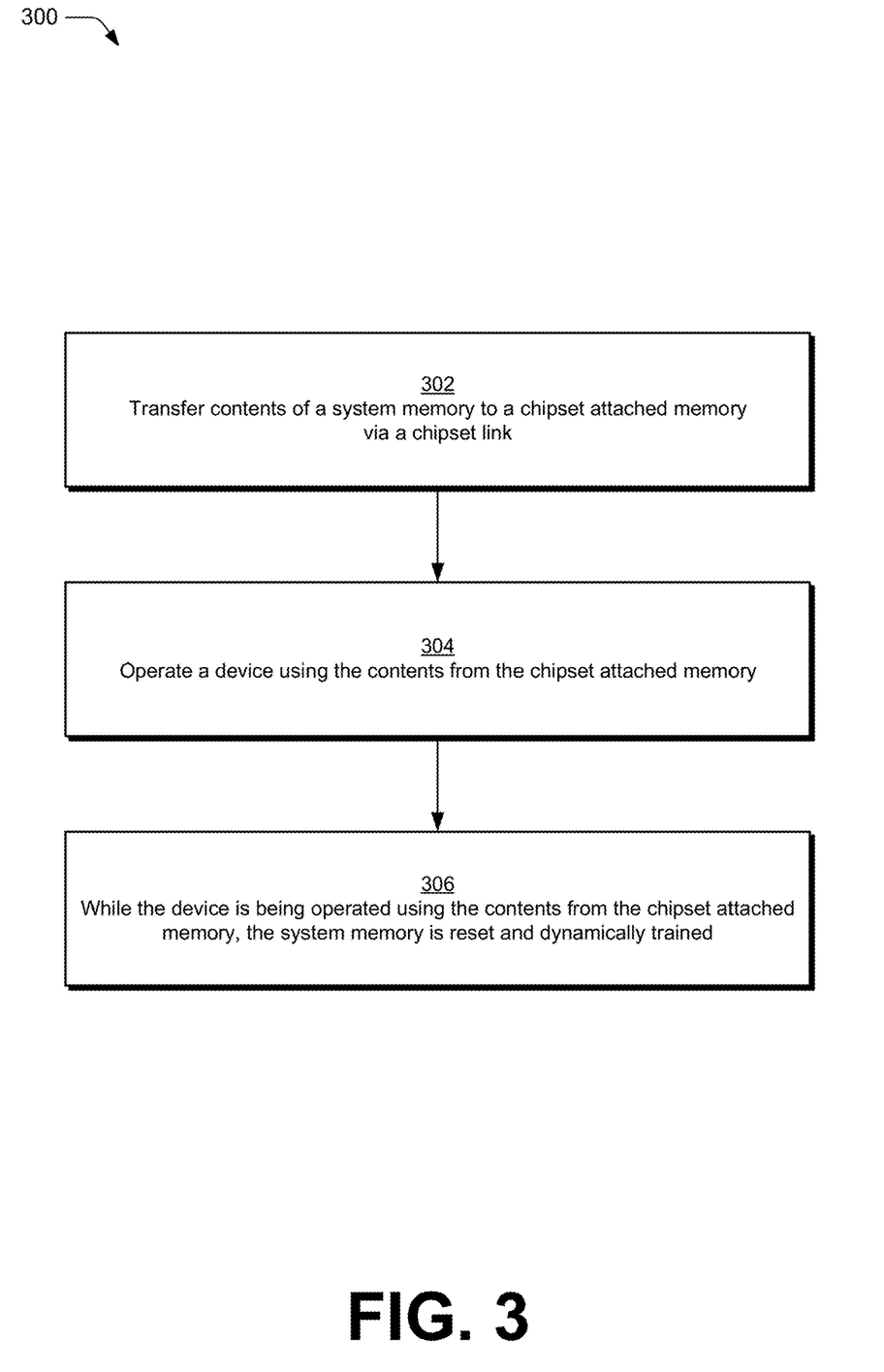
FIG. 3 depicts a procedure in an example implementation of operating a system from chipset attached memory during memory training of system memory.

FIG. 3 depicts a procedure in an example 300 implementation of operating a system from chipset attached memory during memory training of system memory.

Contents of a system memory are transferred to a chipset attached memory via a chipset link (block 302). By way of example, contents 120 of the system memory 104 are transferred via the chipset link 110 to the chipset attached memory 108. Based on or responsive to receipt of the request 118, for instance, the memory controller 114 causes the contents 120 of the system memory 104 to be transferred via the chipset link 110 to the chipset attached memory 108.

A device is operated using the contents from the chipset attached memory (block 304). By way of example, once the contents 120 are transferred to the chipset attached memory 108, various operations are performed using the contents 120 from the chipset attached memory 108. For example, the processing unit 112 executes (and/or seamlessly continues to execute) one or more tasks of an operating system and/or an application using the contents 120 from the chipset attached memory 108. Such tasks are performed using the contents 120 from the chipset attached memory 108 rather than using the contents 120 from the system memory 104.

While the device is being operated using the contents from the chipset attached memory, the system memory is reset and dynamically trained during a reset process (block 306). By way of example, while such operations are performed using the contents 120 from the chipset attached memory 108, the system memory 104 is reset and trained during a reset phase of the system memory 104, such as by the memory controller 114. For example, the system memory 104 is trained according to one or more training algorithms or methodologies. In at least one variation, the training is destructive to the contents 120 stored in the system memory 104.

Figure 4:
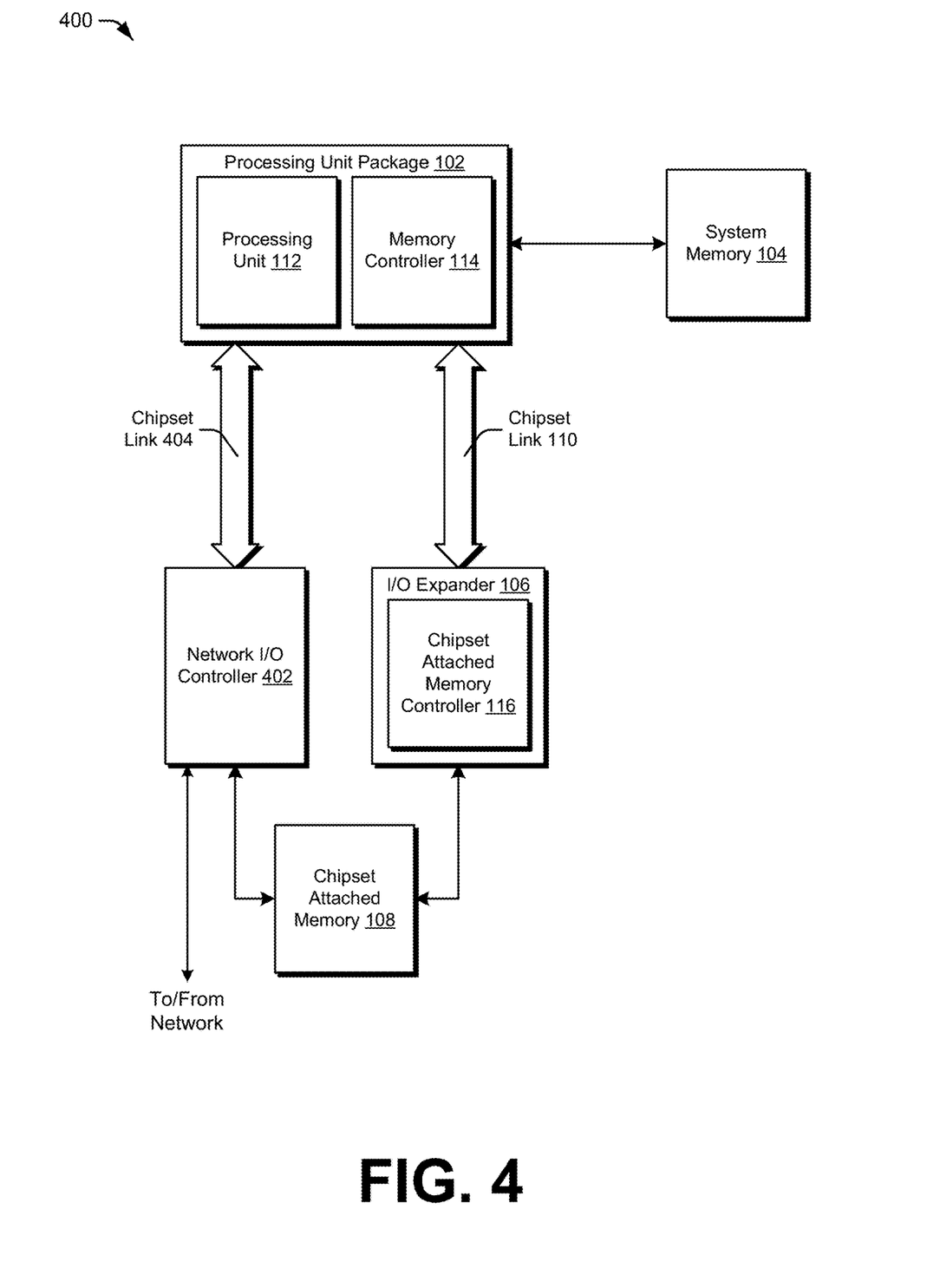
FIG. 4 is an illustration of another non-limiting example system that employs a chipset attached memory to continue operation of the system while memory training system memory.

FIG. 4 is an illustration of another non-limiting example system 400 that employs a chipset attached memory to continue operation of the system while memory training system memory. The system 400 includes the processing unit package 102, the system memory 104, the I/O expander 106, the chipset attached memory 108, and the chipset link 110 analogous to the system 100 of FIG. 1. The system 400 also includes a network I/O controller 402 and a chipset link 404 allowing the processing unit package 102 to communicate with the network I/O controller 402 using any of a variety of communication links analogous to chipset link 110.

The processing unit package 102, the system memory 104, the I/O expander 106, the chipset attached memory 108, the chipset link 110, the network I/O controller 402, and the chipset link 404 are installed on or are part of, for example, a motherboard or other printed circuit board. In one or more implementations, the I/O expander 106 (including the chipset attached memory controller 116), the chipset link 110, the chipset link 404, one or more memory channels between the processing unit package 102 and the system memory 104, and one or more memory channels between the I/O expander 106 and the chipset attached memory 108 are also referred to as a chipset of a motherboard or other printed circuit board.

The processing unit package 102 includes the processing unit 112 and the memory controller 114. Although a single processing unit 112 is illustrated in the system 400, the processing unit package 102 optionally includes any number of processing units of the same or different types, and or other types of components, such as an artificial intelligence accelerator. Given this architecture, such other optional components also access the system memory 104 directly (e.g., via the memory controller 114) or through an operating system running on the processing unit 112. Those components are also configured to access the chipset attached memory 108 (e.g., via the I/O expander 106 or the network I/O controller 402).

The network I/O controller 402 manages communication over a network, such as by sending data or control signals to one or more other devices via the network and receiving data or control signals from one or more other devices via the network. The network is implemented in any of a variety of manners, such as an Ethernet network, an InfiniBand network, and so forth. The network I/O controller 402 is also coupled or attached to the chipset attached memory 108 via one or more memory channels. In one or more implementations, the chipset attached memory 108 is address space (e.g., PCIe address space) that is addressable by other server nodes as well as components of the system 400 (e.g., the processing unit 112). The network I/O controller 402 is thus able to send read and write requests to the chipset attached memory 108 and receive responses from the chipset attached memory 108, analogous to the chipset attached memory controller 116.

In one or more implementations the chipset attached memory 108 is attached or coupled to only one of the network I/O controller 402 or the I/O expander 106 rather than attached or coupled to both the network I/O controller 402 and the I/O expander 106.

The network I/O controller 402 being attached or coupled to the chipset attached memory 108 supports various different usage scenarios. In one or more implementations, the processing unit package 102 is able to access the chipset attached memory 108 via the network I/O controller 402, allowing the chipset attached memory 108 to be used in situations where the chipset attached memory 108 is not attached or coupled to the I/O expander 106. Such situations arise, for example, where board routing limitations prevent the chipset attached memory 108 from being attached or coupled to the I/O expander 106.

In one or more implementations, the network I/O controller 402 allows the chipset attached memory 108 to be accessed by other devices via the network. This access is allowed using any of a variety of public or proprietary remote direct memory access (RDMA) techniques. For example, assume the system 400 is implemented in a server node connected to multiple other server nodes (e.g., some including their own chipset attached memory and optionally others not including their own chipset attached memory). Another server node communicates read and write requests to the chipset attached memory 108 via the network I/O controller 402 and receives responses from the chipset attached memory 108 via the network I/O controller 402. The other server node is thus able to make use of the chipset attached memory 108 without disrupting the system memory 104 or even the processing unit package 102. E.g., the processing unit package 102 need not have knowledge of the other server node accessing the chipset attached memory 108.

By way of another example, assume the system 400 is implemented in a server node connected to multiple other server nodes, at least one of which includes its own chipset attached memory. In at least one variation, the processing unit 112 (or other component of the processing unit package 102) is able to communicate read and write requests to the chipset attached memory of the other server node via the network I/O controller 402 and receive responses from the chipset attached memory of the other server node via the network I/O controller 402. The processing unit 112 or other component of the processing unit package 102 is thus able to make use of the chipset attached memory of another sever node without disrupting the system memory 104 or the chipset attached memory 108.

Figure 5:
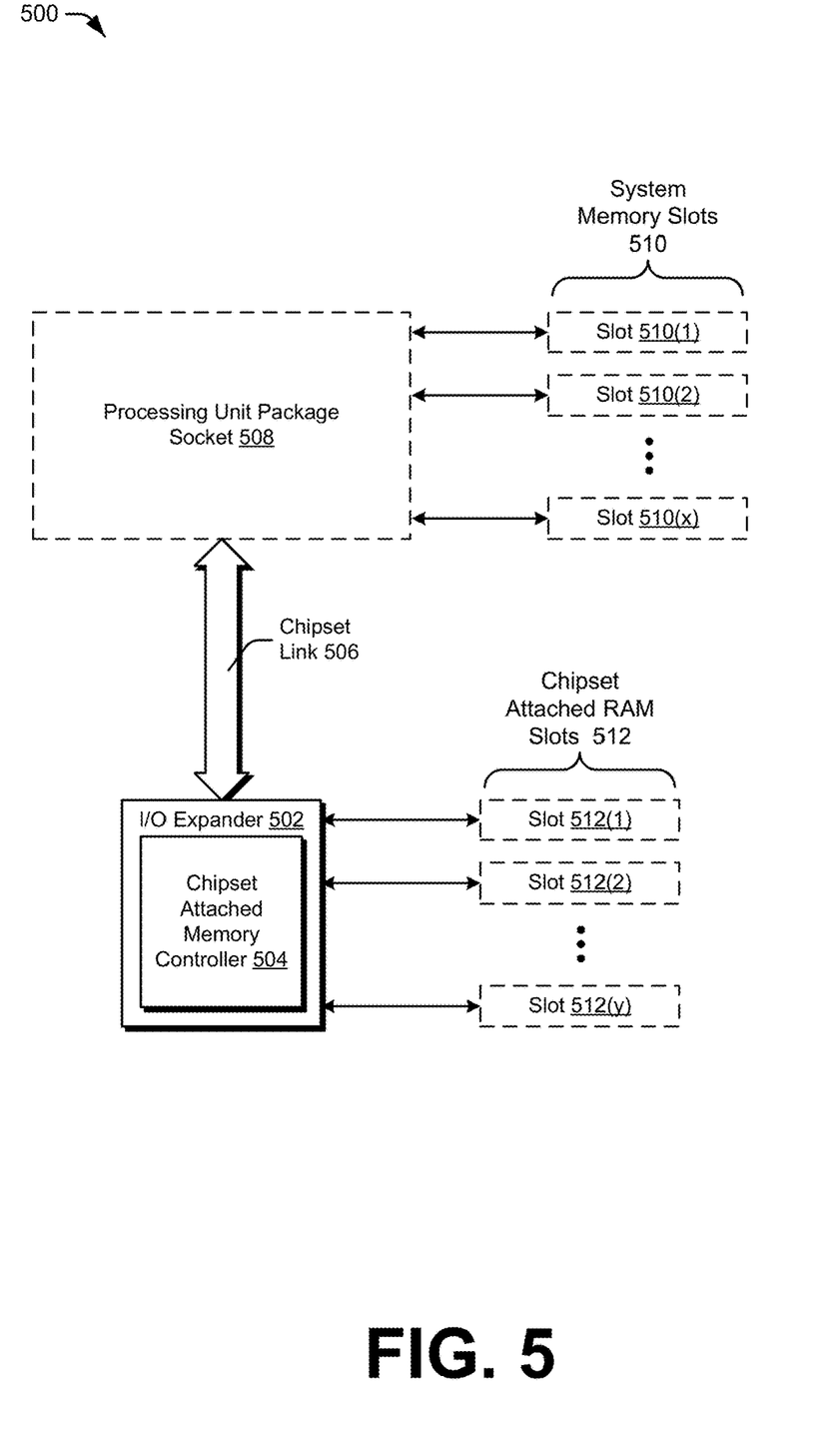
FIG. 5 is an illustration of another non-limiting example system that employs a chipset attached memory to continue operation of the system while memory training system memory.

FIG. 5 is an illustration of another non-limiting example system 500 that employs a chipset attached memory to continue operation of the system while memory training system memory. The system 500 is, for example, a motherboard or other printed circuit board. The system 500 includes an I/O expander 502 that includes a chipset attached memory controller 504, and a chipset link 506. The system 500 also includes a processing unit package socket 508, system memory slots 510, and chipset attached memory slots 512. The processing unit package socket 508 is designed to have a processing unit package, such as the processing unit package 102 of FIG. 1 or FIG. 4, installed or inserted therein. In one or more implementations, the I/O expander 502 (including the chipset attached memory controller 504), the chipset link 506, one or more memory channels between the processing unit package socket 508 and the system memory slots 510, and one or more memory channels between the I/O expander 502 and the chipset attached memory slots 512 are also referred to as a chipset of a motherboard or other printed circuit board.

The I/O expander 502 is an I/O expander analogous to the I/O expander 106 of FIG. 1 or FIG. 4. The chipset attached memory controller 504 is a chipset attached memory controller analogous to the chipset attached memory controller 116 of FIG. 1 or FIG. 4. The chipset link 506 is analogous to the chipset link 110 of FIG. 1 or FIG. 4.

The system memory slots 510 include multiple ("x") memory slots 510(1), 510(2), . . . , 510(x). The system memory slots 510 are designed to have system memory, such as the system memory 104 of FIG. 1 or FIG. 4, installed or inserted therein. The system memory slots 510 are, for example, DIMM, SO-DIMM, or RDIMM slots. Although multiple memory slots 510(1), 510(2), . . . , 510(x) are illustrated, the system 500 optionally includes a single memory slot 510 or any other number of memory slots 510.

The chipset attached memory slots 512 include multiple ("y") slots 512(1), 512(2), . . . , 512(y). The chipset attached memory slots 512 are designed to have chipset attached memory, such as the chipset attached memory 108 of FIG.

1 or FIG. 4, installed or inserted therein. The chipset attached memory slots 512 are, for example, DIMM, SO-DIMM, or RDIMM slots. Although multiple memory slots 512(1), 512(2), . . . , 512(y) are illustrated, the system 500 optionally includes a single memory slot 512 or any other number of memory slots 512. In one or more implementations, the number of chipset attached memory slots 512 is equal to or greater than the number of system memory slots 510 of the system memory 104. In one or more implementations, if the number of chipset attached memory slots 512 is less than the number of system memory slots 510, the system may determine portions of the contents of the system memory 104 which do not need to be transferred to the chipset attached memory. In one or more implementations, multiple chipset attached memories may be attached to the system, in which case the contents of the system memory 104 can be transferred to different ones of the multiple chipset attached memories.

With a processing unit package installed or inserted in the processing unit package socket 508, system memory installed or inserted in the system memory slots 510, chipset attached memory installed or inserted in the chipset attached memory slots 512, and additional I/O devices (e.g., a chipset attached nonvolatile memory and/or a chipset attached disk drive) optionally installed or otherwise coupled to the I/O expander 502, the system 500 becomes the system 100 of FIG. 1 or a system having tiered memory options.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing unit package 102, the system memory 104, the chipset attached memory 108, the chipset link 110, the processing unit 112, the memory controller 114, and the chipset attached memory controller 116) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus comprising:
a system memory;
a memory controller configured to:
provide a transfer request to the system memory to cause contents maintained by the system memory to be transferred from the system memory to a chipset attached memory; and
reset and train the system memory; and
a processing unit to continue to operate by executing one or more tasks using the contents transferred from the system memory and stored in the chipset attached memory while the system memory is being reset and trained.

2. The apparatus of claim 1, wherein the memory controller is further configured to, after the system memory is trained, provide an additional transfer request to the chipset attached memory to cause the contents to be transferred back from the chipset attached memory to the trained system memory.

3. The apparatus of claim 2, wherein the processing unit is further configured to execute one or more tasks using the contents transferred back to the trained system memory.

4. The apparatus of claim 1, wherein the memory controller provides the transfer request responsive to receiving a request to train the system memory.

5. The apparatus of claim 4, wherein the request to train the system memory includes one or more specified memory settings or a specified memory profile.

6. The apparatus of claim 4, wherein the request to train the system memory comprises a user request.

7. The apparatus of claim 6, wherein the user request identifies a specific improvement to the system memory.

8. The apparatus of claim 7, wherein the specific improvement of the system memory comprises one or more of an improvement in speed, performance, power, usage, or accuracy.

9. The apparatus of claim 4, wherein the request comprises an automatic system request.

10. A method comprising:
transferring, via a chipset link, contents of a system memory to a chipset attached memory; and
continuing to operate a device using the contents from the chipset attached memory while the system memory is reset and trained.

11. The method of claim 10, wherein the operating the device includes executing, by a processing unit of the device, one or more tasks of an operating system or an application using the contents from the chipset attached memory.

12. The method of claim 10, further comprising, after the system memory is trained, transferring, via the chipset link, the contents back from the chipset attached memory to the trained system memory via the chipset link.

13. The method of claim 12, further comprising operating the device using the contents transferred back to the trained system memory.

14. The method of claim 12, further comprising, after the system memory is trained, outputting one or more notifications indicating that the system memory has been trained.

15. The method of claim 10, wherein the transferring occurs responsive to receiving a request to train the system memory.

16. The method of claim 15, wherein the request to train the system memory includes one or more specified memory settings or a specified memory profile.

17. The method of claim 15, wherein the request to train the system memory comprises a user request.

18. The method of claim 17, wherein the user request identifies a specific improvement to the system memory that includes one or more of an improvement in speed, performance, power, usage, or accuracy.

19. The method of claim 15, wherein the request comprises an automatic system request.

20. A system comprising:
a system memory;
a chipset attached memory configured to store contents of the system memory while the system memory is reset and trained and transfer the contents back to the trained system memory after the training is complete; and
a processing unit configured to continue to operate by performing operations using the contents transferred from the system memory and stored in the chipset attached memory while the system memory is being reset and trained.

\* \* \* \* \*